United States Patent
Li et al.

(10) Patent No.: US 11,252,673 B2
(45) Date of Patent: Feb. 15, 2022

(54) COMMUNICATION METHOD, TERMINAL, AND NETWORK DEVICE

(71) Applicant: HUAWEI TECHNOLOGIES CO., LTD., Guangdong (CN)

(72) Inventors: Junchao Li, Shanghai (CN); Hao Tang, Shanghai (CN); Liwen Zhang, Shanghai (CN); Wei Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/579,612

(22) Filed: Sep. 23, 2019

(65) Prior Publication Data

US 2020/0022090 A1    Jan. 16, 2020

Related U.S. Application Data

(63) Continuation of application No. PCT/CN2018/080040, filed on Mar. 22, 2018.

(30) Foreign Application Priority Data

Mar. 24, 2017    (CN) .......................... 201710184620.9

(51) Int. Cl.
*H04W 52/24* (2009.01)
*H04W 52/14* (2009.01)
*H04W 84/04* (2009.01)

(52) U.S. Cl.
CPC ........ *H04W 52/242* (2013.01); *H04W 52/146* (2013.01); *H04W 84/042* (2013.01)

(58) Field of Classification Search
CPC . H04W 52/146; H04W 52/242; H04W 52/48; H04W 84/042; H04W 52/16;
(Continued)

(56) References Cited

U.S. PATENT DOCUMENTS

2009/0219893 A1* 9/2009 Korpela ............... H04B 17/318
370/332
2010/0296410 A1* 11/2010 Kazmi .................. H04W 24/10
370/252
(Continued)

FOREIGN PATENT DOCUMENTS

CN    102177753 A    9/2011
CN    103209470 A    7/2013
(Continued)

OTHER PUBLICATIONS

Huawei, "Coonnssii derations of NR UL operation",3GPP TSG RAN WGl Meeting #88,R1-1701668, Athens, Greece Feb. 13-17, 2017, 5 pages.
(Continued)

*Primary Examiner* — Ankur Jain
(74) *Attorney, Agent, or Firm* — Fish & Richardson P.C.

(57) ABSTRACT

A communication method, a terminal, and a network device are provided. The method includes: receiving, by a terminal, a downlink reference signal sent by a network device in a first cell, and determining a downlink path loss estimate between the terminal and the first cell based on the downlink reference signal; and sending, by the terminal, an uplink signal in a second cell, where uplink transmit power used by the terminal to send the uplink signal is determined based on the downlink path loss estimate.

16 Claims, 8 Drawing Sheets

(58) Field of Classification Search
CPC . H04W 52/244; H04W 52/325; H04W 52/40; H04W 52/54; H04W 36/0061; H04W 36/0066; H04W 36/0069; H04W 72/0413; H04W 16/10; H04W 16/14; H04W 52/34; H04W 72/0473; H04W 74/0833; H04W 52/247; H04W 52/248; H04L 5/0035; H04L 5/001; H04L 5/0048; H04L 5/0062; H04L 5/0098; H04J 11/0026; H04J 11/005; H04J 11/0066; H04B 1/71; H04B 1/146; H04B 1/16; H04B 1/242; H04B 1/244; H04B 1/247; H04B 1/248; H04B 1/325; H04B 1/40; H04B 1/48; H04B 1/54

See application file for complete search history.

(56) References Cited

U.S. PATENT DOCUMENTS

| | | | |
|---|---|---|---|
| 2011/0065438 A1* | 3/2011 | Bergman | H04W 36/06 455/436 |
| 2011/0182201 A1 | 7/2011 | Pajukoski et al. | |
| 2013/0083730 A1* | 4/2013 | Gaal | H04W 52/244 370/328 |
| 2013/0272158 A1* | 10/2013 | Park | H04W 72/0413 370/252 |
| 2014/0301360 A1* | 10/2014 | Bontu | H04W 36/32 370/331 |
| 2016/0278021 A1* | 9/2016 | Takeda | H04W 52/267 |
| 2016/0302230 A1* | 10/2016 | Novlan | H04W 40/244 |
| 2017/0026891 A1 | 1/2017 | Hahn et al. | |
| 2017/0257774 A1* | 9/2017 | Ghosh | H04L 5/0048 |

FOREIGN PATENT DOCUMENTS

| | | |
|---|---|---|
| CN | 104010358 A | 8/2014 |
| CN | 106134256 A | 11/2016 |
| EP | 2981123 A1 | 2/2016 |

OTHER PUBLICATIONS

Office Action issued in Chinese Application No. 201710184620.9 dated Feb. 25, 2020, 7 pages.
Xiaodong et al, "Research on 5G New Air Interface and LTE Carrier Sharing" Guangzhou Research Institute of China Telecom Co., Ltd., Guangzhou, China, Aug. 25, 2018, 15 pages (With English Translation).
3GPP TS 36.211 V14.2.0 (Mar. 2017), 3rd Generation Partnership Project;Technical Specification Group Radio Access Network, Evolved Universal Terrestrial Radio Access (E-UTRA), Physical channels and modulation(Release 14), 197 pages.
Huawei HiSilicon, Overview of NR UL for LTE-NR coexistence; 3GPP TSG RAN WG1 Meeting #89, R1-1706905, Hangzhou, China, May 15-19, 2017; Agenda Item:7.1.8, 13 pages.
Nokia, Alcatel-Lucent Shanghai Bell, "LTE + NR uplink spectrum sharing" 3GPP TSG-RAN WG1#88,Agenda item: 8.1.8, R1-1703194, Athens, Greece, Feb. 13-17, 2017, 4 pages.
Extended European Search Report issued in European Application No. 18771237.7 dated Jan. 31, 2020, 8 pages.
PCT International Search Report in International Application No. PCT/CN2018/080,040, dated Jun. 19, 2018, 3 pages.
3GPP TS 36.213 V14.2.0 (Mar. 2017), 3rd Generation Partnership Project; Technical Specification Group Radio Access Network; Evolved Universal Terrestrial Radio Access (E-UTRA); Physical layer procedures(Release 14), 454 pages.
Office Action issued in Chinese Application No. 201710184620.9 dated Aug. 26, 2020, 8 pages (with English translation).
Office Action issued in Chinese Application No. 2017108184620.9 dated Jan. 12, 2021, 4 pages.

* cited by examiner

COMMUNICATION METHOD, TERMINAL, AND NETWORK DEVICE

CROSS-REFERENCE TO RELATED APPLICATIONS

This application is a continuation of International Application No. PCT/CN2018/080040, filed on Mar. 22, 2018, which claims priority to Chinese Patent Application No. 201710184620.9, filed on Mar. 24, 2017, both of which are incorporated herein by reference in their entireties.

TECHNICAL FIELD

This application relates to the field of communications technologies, and in particular, to a communication method, a terminal, and a network device.

BACKGROUND

With multi-standard networking, different communications systems may implement uplink and downlink decoupling in a bidirectional connection manner, to efficiently utilize a spectrum and a low-frequency coverage capability, thereby greatly improving system uplink coverage. When a new radio (New Radio, NR) system is jointly networked with a long term evolution (Long Term Evolution, LTE) system, a low frequency (Low Frequency, LF) carrier of the NR system coexists with an LF carrier of the LTE system in a frequency division multiplexing (Frequency Division Multiplexing, FDM) or time division multiplexing (Time Division Multiplexing, TDM) manner. For example, when an NR cell and an LTE cell implement uplink and downlink decoupling in a bidirectional connection manner, the LTE cell may be a master cell, and the NR cell may be a secondary cell. An uplink frequency of the master cell may be configured to be the same as an uplink frequency of the secondary cell, and both cells use LF carriers. A downlink frequency of the master cell is configured to be different from a downlink frequency of the secondary cell. The master cell uses an LF carrier, and the secondary cell uses a high frequency (High Frequency, HF) carrier.

Because an HF carrier and an LF carrier are far apart in frequency domain, for example, the HF carrier is at 3.5 GHz, and the LF carrier is at 1.8 GHz, a channel usually has no uplink-downlink reciprocity. If receive power of a terminal for receiving a downlink reference signal on an HF downlink carrier is used in a secondary cell to estimate, according to a conventional method, a downlink path loss estimate used by the terminal when the terminal sends a signal on an LF uplink carrier, a relatively large error occurs. Therefore, accuracy of uplink transmit power that is determined based on the downlink path loss estimate and that is of the terminal in the secondary cell is reduced.

A relatively large error occurs when the receive power for receiving the downlink reference signal on the HF downlink carrier is used to estimate, according to the conventional method, the downlink path loss estimate used by the terminal for LF uplink sending. Therefore, how to determine uplink transmit power of a terminal in a secondary cell is an urgent problem to be resolved.

SUMMARY

This application provides a communication method, a terminal, and a network device, so as to resolve a problem of how to determine uplink transmit power of a terminal in a cell when there is no reciprocity between an uplink channel and a downlink channel of the cell.

An embodiment of this application provides a communication method, and the method includes:
receiving, by a terminal, a downlink reference signal sent by a network device in a first cell, and determining a downlink path loss estimate between the terminal and the first cell based on the downlink reference signal; and
sending, by the terminal, an uplink signal in a second cell, where uplink transmit power used by the terminal to send the uplink signal is determined based on the downlink path loss estimate.

According to the foregoing method, the terminal determines the downlink path loss estimate between the terminal and the first cell by receiving the downlink reference signal sent by the network device in the first cell, so as to determine, based on the downlink path loss estimate, the uplink transmit power used by the terminal to send the uplink signal in the second cell, so that when there is no reciprocity between an uplink channel and a downlink channel of the second cell, the terminal determines the uplink transmit power of the terminal in the second cell by using the first cell. When uplink frequencies configured for the first cell and the second cell are the same, and there is reciprocity between an uplink channel and a downlink channel of the first cell (for example, a frequency range between an uplink frequency and a downlink frequency is less than a threshold), the uplink transmit power used by the terminal to send the uplink signal in the second cell may be accurately determined, thereby resolving an inaccuracy problem of estimating a low-frequency uplink path loss by using a high-frequency downlink reference signal due to non-reciprocity between a high-frequency channel and a low-frequency channel.

Optionally, the determining, by the terminal, a downlink path loss estimate between the terminal and the first cell based on the downlink reference signal includes:
determining, by the terminal, the downlink path loss estimate based on receive power for receiving the downlink reference signal and transmit power for sending the downlink reference signal.

Optionally, uplink frequencies configured for the first cell and the second cell are the same, and downlink frequencies configured for the first cell and the second cell are different.

Optionally, the uplink signal is physical uplink channel information or physical uplink signal information.

An embodiment of this application provides a communication method, and the method includes:
sending, by a network device, a downlink reference signal to a terminal in a first cell; and
receiving, by the network device, an uplink signal sent by the terminal in a second cell, where uplink transmit power of the uplink signal is determined by the terminal based on a downlink path loss estimate of the terminal in the first cell, and the downlink path loss estimate is determined by the terminal based on the downlink reference signal.

According to the foregoing method, the network device sends the downlink reference signal to the terminal in the first cell, so that the terminal determines the downlink path loss estimate between the terminal and the first cell. Therefore, the terminal can determine, based on the downlink path loss estimate, the uplink transmit power used by the terminal to send the uplink signal in the second cell, so that when there is no reciprocity between an uplink channel and a downlink channel of the second cell, the terminal determines the uplink transmit power of the terminal in the second cell by using the first cell. When uplink frequencies configured for the first cell and the second cell are the same, and there is reciprocity between an uplink channel and a downlink channel of the first cell (for example, a frequency range between an uplink frequency and a downlink frequency is less than a threshold), the uplink transmit power used by the terminal to send the uplink signal in the second cell may be accurately determined, thereby resolving an inaccuracy problem of estimating a low-frequency uplink path loss by using a high-frequency downlink reference signal due to non-reciprocity between a high-frequency channel and a low-frequency channel.

An embodiment of this application provides a communication method, and the method includes:
  receiving, by a terminal, configuration information sent by a network device, where the configuration information indicates a first cell identifier; and
  sending, by the terminal, an uplink signal to the network device, where a scrambling sequence or a cyclic shift corresponding to the uplink signal is determined based on the first cell identifier.

According to the foregoing method, when sending the uplink signal to a plurality of cells (for example, a first cell and a second cell) of the network device, the terminal in the plurality of cells of the network device determines, based on the first cell identifier indicated by the network device, the scrambling sequence or the cyclic shift of the uplink signal by using the same first cell identifier, thereby reducing inter-terminal interference.

Optionally, the sending, by the terminal, an uplink signal to the network device includes:
  sending, by the terminal, the uplink signal to a first cell or a second cell of the network device, where uplink frequencies configured for the first cell and the second cell are the same, and downlink frequencies configured for the first cell and the second cell are different.

Optionally, the receiving, by a terminal, configuration information sent by a network device includes:
  receiving, by the terminal in the first cell of the network device, the configuration information sent by the network device, where the first cell identifier indicated by the configuration information is a cell identifier of the second cell of the network device.

Optionally, the receiving, by a terminal, configuration information sent by a network device includes:
  receiving, by the terminal in the second cell of the network device, the configuration information sent by the network device, where the first cell identifier indicated by the configuration information is a cell identifier of the first cell of the network device.

Optionally, the receiving, by a terminal, configuration information sent by a network device includes:
  receiving, by the terminal, the configuration information by using higher layer signaling sent by the network device, where
  the higher layer signaling is any one of the following:
  system information;
  a random access response;
  a message 3 in a random access procedure; and
  radio resource control signaling.

Optionally, the uplink signal is physical uplink channel information or physical uplink signal information.

An embodiment of this application provides a communication method, and the method includes:
  sending, by a network device, configuration information to a terminal, where the configuration information indicates a first cell identifier; and
  receiving, by the network device, an uplink signal sent by the terminal, where a scrambling sequence or a cyclic shift corresponding to the uplink signal is determined based on the first cell identifier.

According to the foregoing method, the network device indicates, to the terminal, the first cell identifier used for sending the uplink signal, so that when sending the uplink signal to a first cell and a second cell, the terminal in both the first cell and the second cell of the network device determines the scrambling sequence or the cyclic shift of the uplink signal by using the same first cell identifier, thereby reducing inter-terminal interference.

Optionally, the sending, by a network device, configuration information to a terminal includes:
  sending, by the network device, the configuration information to the terminal by using higher layer signaling, where
  the higher layer signaling is any one of the following:
  system information;
  a random access response;
  a message 3 in a random access procedure; and
  radio resource control signaling.

An embodiment of this application provides a terminal, including:
  a transceiver unit, configured to receive a downlink reference signal sent by a network device in a first cell; and
  a processing unit, configured to determine a downlink path loss estimate between the terminal and the first cell based on the downlink reference signal, where
  the transceiver unit is configured to send an uplink signal in a second cell, where uplink transmit power used by the terminal to send the uplink signal is determined based on the downlink path loss estimate.

Optionally, the processing unit is specifically configured to:
  determine the downlink path loss estimate based on receive power for receiving the downlink reference signal and transmit power for sending the downlink reference signal.

Optionally, uplink frequencies configured for the first cell and the second cell are the same, and downlink frequencies configured for the first cell and the second cell are different.

Optionally, the uplink signal is physical uplink channel information or physical uplink signal information.

An embodiment of this application provides a network device, including:
  a sending unit, configured to send a downlink reference signal to a terminal in a first cell; and
  a receiving unit, configured to receive an uplink signal sent by the terminal in a second cell, where uplink transmit power of the uplink signal is determined by the terminal based on a downlink path loss estimate of the terminal in the first cell, and the downlink path loss estimate is determined by the terminal based on the downlink reference signal.

An embodiment of this application provides a terminal, including:
  a receiving unit, configured to receive configuration information sent by a network device, where the configuration information indicates a first cell identifier; and
  a sending unit, configured to send an uplink signal to the network device, where a scrambling sequence or a cyclic shift corresponding to the uplink signal is determined based on the first cell identifier.

Optionally, the sending unit is specifically configured to: send the uplink signal to a first cell or a second cell of the network device, where uplink frequencies configured for the first cell and the second cell are the same, and downlink frequencies configured for the first cell and the second cell are different.

Optionally, the receiving unit is specifically configured to: receive, in the first cell of the network device, the configuration information sent by the network device, where the first cell identifier indicated by the configuration information is a cell identifier of the second cell of the network device.

Optionally, the receiving unit is specifically configured to: receive, in the second cell of the network device, the configuration information sent by the network device, where the first cell identifier indicated by the configuration information is a cell identifier of the first cell of the network device.

Optionally, the sending unit is specifically configured to: receive the configuration information by using higher layer signaling sent by the network device, where
the higher layer signaling is any one of the following:
system information;
a random access response;
a message 3 in a random access procedure; and
radio resource control signaling.

Optionally, the uplink signal is physical uplink channel information or physical uplink signal information.

An embodiment of this application provides a network device, including:
a sending unit, configured to send configuration information to a terminal, where the configuration information indicates a first cell identifier; and
a receiving unit, configured to receive an uplink signal sent by the terminal, where a scrambling sequence or a cyclic shift corresponding to the uplink signal is determined based on the first cell identifier.

Optionally, the sending unit is specifically configured to: send the configuration information to the terminal by using higher layer signaling, where
the higher layer signaling is any one of the following:
system information;
a random access response;
a message 3 in a random access procedure; and
radio resource control signaling.

An embodiment of this application further provides a terminal, and the terminal includes:
a transceiver, a memory, and a processor. The memory is configured to store program code that needs to be executed by the processor. The transceiver is configured to communicate with the network device in any one of the foregoing communication methods. The processor is configured to execute the program code stored in the memory, and is specifically configured to perform the communication method in any one of the foregoing designs.

An embodiment of this application further provides a network device, and the network device includes:
a transceiver, a memory, and a processor. The memory is configured to store program code that needs to be executed by the processor. The transceiver is configured to communicate with the terminal in any one of the foregoing communication methods. The processor is configured to execute the program code stored in the memory, and is specifically configured to perform the communication method in any one of the foregoing designs.

This application further provides a computer readable storage medium, configured to store a computer software instruction used to execute any designed function of any one of the foregoing communication methods. The computer software instruction includes a program designed to perform the communication method in any one of the foregoing designs.

An embodiment of this application further provides a communications system. The system includes the terminal or the network device provided in any one of the foregoing designs. Optionally, the system may further include another device that interacts with the terminal or the network device in the solutions provided in the embodiments of this application.

An embodiment of this application further provides a computer program product including an instruction. When the instruction runs on a computer, the computer is enabled to perform the communication method in the foregoing aspects.

DESCRIPTION OF EMBODIMENTS

The following further describes this application in detail with reference to accompanying drawings.

The embodiments of this application may be applied to various mobile communications systems, such as a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, a long term evolution advanced (Advanced Long Term Evolution, LTE-A) system, a universal mobile telecommunications system (Universal Mobile Telecommunication System, UMTS), an evolved long term evolution (evolved Long Term Evolution, eLTE) system, and a 5G system (for example, an NR system), and other mobile communications system.

In the following, some terms in this application are described, so as to help a person skilled in the art have a better understanding.

(1) A terminal, also referred to as user equipment (User Equipment, UE), is a device that provides a user with voice and/or data connectivity, for example, a handheld device or a vehicle-mounted device having a wireless connection function. Common terminals include, for example, a mobile phone, a tablet computer, a notebook computer, a palmtop computer, a mobile Internet device (mobile interne device, MID), and a wearable device, such as a smartwatch, a smart band, or a pedometer.

(2) A network device may be a common base station (for example, NodeB or eNB), or a new radio controller (New Radio controller, NR controller), or a gNB in an NR system, or a centralized unit (Centralized Unit), or a new radio base station, or a remote radio unit, or a micro base station, or a relay (relay), or a distributed unit (Distributed Unit), or a transmission reception point (Transmission Reception Point, TRP) or a transmission point (Transmission Point, TP), or any other wireless access device. However, the embodiments of this application are not limited thereto.

Figure 1:
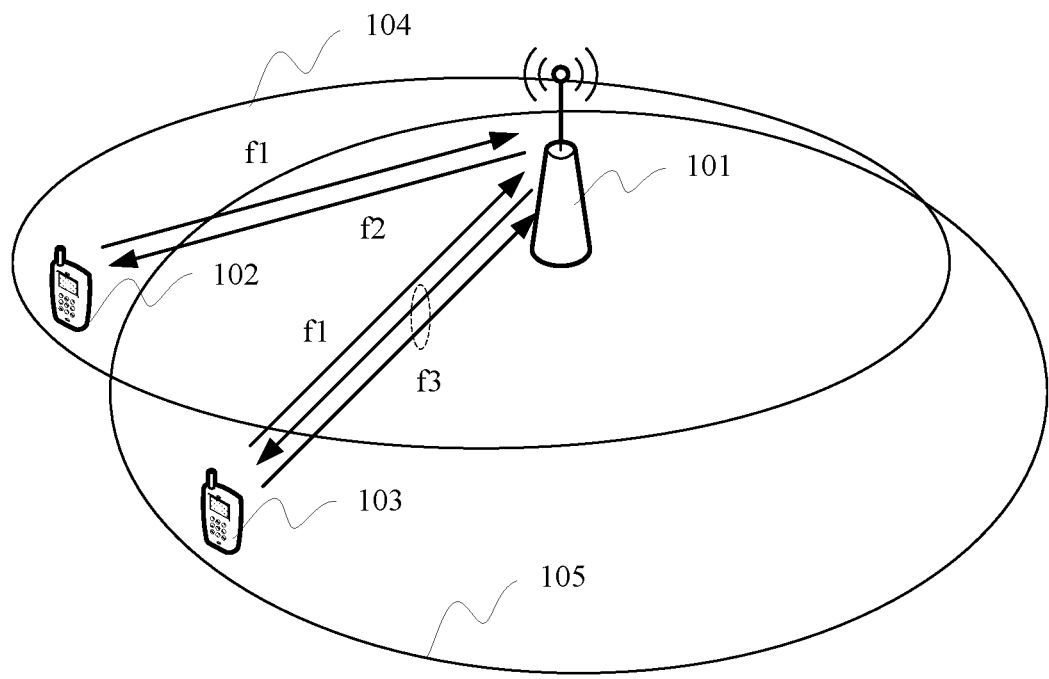
FIG. 1 is a schematic diagram of a bidirectional connection scenario to which an embodiment of this application is applicable.

An embodiment of this application is applicable to a scenario in which an LTE system is bidirectionally connected to an NR system. FIG. 1 is a schematic diagram of a bidirectional connection scenario to which an embodiment of this application is applicable. In FIG. 1, a network device 101 may simultaneously work in an LTE system and an NR system, that is, the network device 101 may simultaneously establish a connection of an LTE cell 104 and a connection of an NR cell 105. A terminal 102 in the LTE cell 104 is a terminal that supports the LTE system, and a terminal 103 in the NR cell 105 is a terminal that supports the NR system. The terminal 102 performs uplink communication with the network device 101 by using a low-frequency spectrum f1, and performs downlink communication with the network device 101 by using a low-frequency spectrum f2. The terminal 103 performs uplink communication with the network device 101 by using the low-frequency spectrum f1, and performs downlink communication with the network device 101 by using a high-frequency spectrum f3.

Figure 2:
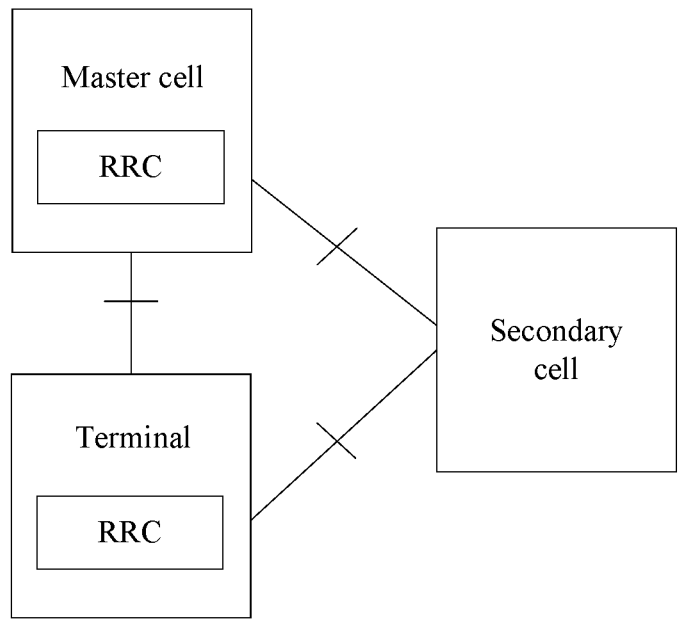
FIG. 2 is a schematic structural diagram of a control plane in a first bidirectional connection scenario.

In the bidirectional connection scenario, each terminal has only one radio resource control (Radio Resource Control, RRC) state, that is, an RRC connected (RRC_connected) state or an RRC idle (RRC_idle) state. Based on the foregoing principle, the 3rd Generation Partnership Project (3rd Generation Partnership Project, 3GPP) proposes two control plane structures in the bidirectional connection scenario. FIG. 2 is a schematic structural diagram of a control plane in a first bidirectional connection scenario. A structure shown in FIG. 2 may be referred to as a C1 structure.

Control plane structure in the first bidirectional connection scenario: After performing radio resource management (Radio Resource Management, RRM) coordination, a master cell (Master Cell, MC) and a secondary cell (Secondary Cell, SC) jointly send final RRC signaling to a terminal. After identifying RRC signaling from the master cell, an RRC entity of the terminal feeds back response information only to an RRC entity of the master cell. With reference to FIG. 1, the master cell may be the LTE cell 104, and the secondary cell may be the NR cell 105. Certainly, this is only an example. There may be another case of the master cell and the secondary cell. Details are not described herein.

Figure 3:
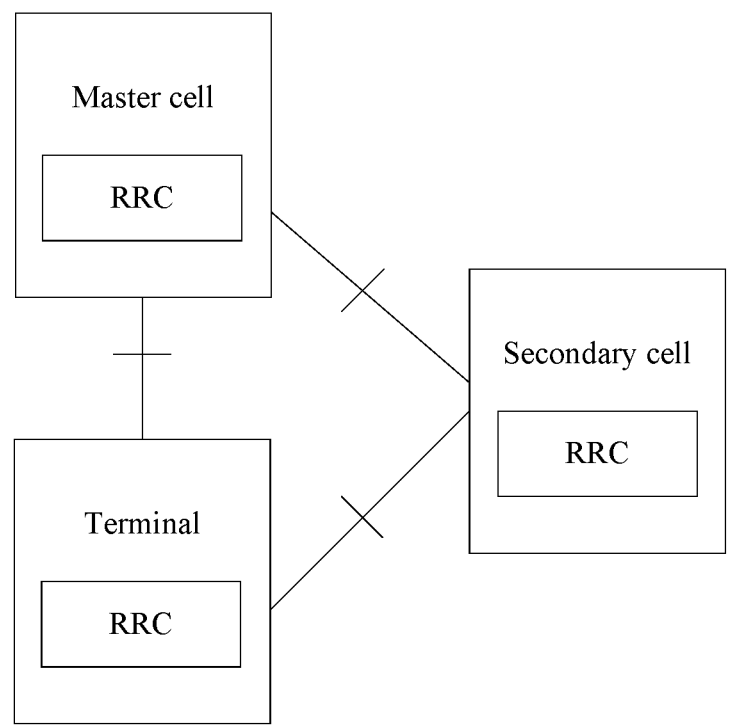
FIG. 3 is a schematic structural diagram of a control plane in a second bidirectional connection scenario.

FIG. 3 is a schematic structural diagram of a control plane in a second bidirectional connection scenario. A structure shown in FIG. 3 may be referred to as a C2 structure.

Control plane structure in the second bidirectional connection scenario: After performing RRM coordination, a master cell and a secondary cell jointly send final RRC signaling to a terminal. After identifying the RRC signaling from the master cell and the secondary cell, an RRC entity of the terminal separately sends a response message to RRC entities of two base stations. With reference to FIG. 1, the master cell may be the LTE cell 104, and the secondary cell may be the NR cell 105. Certainly, this is only an example. There may be another case of the master cell and the secondary cell. Details are not described herein.

Because a bidirectional connection technology is introduced, a terminal may perform service transmission by using a master cell and at least one secondary cell, thereby improving transmission efficiency of the terminal.

Figure 4:
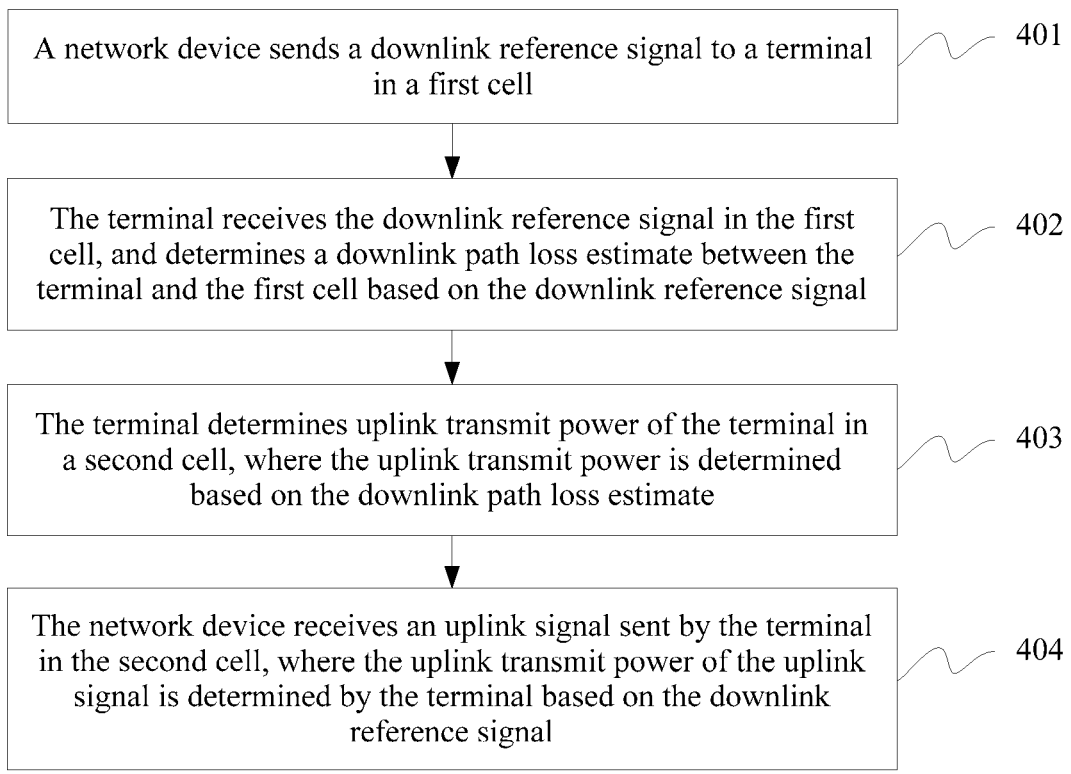
FIG. 4 is a schematic flowchart of a communication method according to an embodiment of this application.

Based on the foregoing description, FIG. 4 is a schematic flowchart of a communication method according to an embodiment of this application. The method includes the following steps:

Step 401: A network device sends a downlink reference signal to a terminal in a first cell.

Step 402: The terminal receives the downlink reference signal sent by the network device in the first cell, and determines a downlink path loss estimate between the terminal and the first cell based on the downlink reference signal.

Step 403: The terminal sends an uplink signal in a second cell, where uplink transmit power used by the terminal to send the uplink signal is determined based on the downlink path loss estimate.

Step 404: The network device receives the uplink signal sent by the terminal in the second cell, where the uplink transmit power of the uplink signal is determined by the terminal based on the downlink path loss estimate of the terminal in the first cell, and the downlink path loss estimate is determined by the terminal based on the downlink reference signal.

In step 401, the downlink reference signal sent by the network device may be a cell-specific reference signal (cell-reference signal, CRS), or may be a channel state information-reference signal (Channel State Information-Reference Signals, CSI-RS), or may be a secondary synchronization signal (Secondary Synchronization Signal, SSS), a positioning reference signal (positioning reference signals, PRS), or the like. This is not limited in this embodiment of this application.

In step 402, the terminal may determine the downlink path loss estimate based on receive power for receiving the downlink reference signal and transmit power for sending the downlink reference signal. Specifically, the terminal may determine a difference between the receive power for receiving the downlink reference signal and the transmit power used by the network device to send the downlink reference signal as the downlink path loss estimate.

It should be noted that how the terminal determines the transmit power used by the network device to send the downlink reference signal is not limited in this embodiment of this application. For example, the network device may notify the terminal of the transmit power for sending the downlink reference signal.

In step 403, the terminal may determine, based on the downlink path loss estimate, the uplink transmit power used by the terminal to send the uplink signal in the second cell, where the uplink signal includes but is not limited to uplink signals such as physical uplink data channel information and physical uplink signal information. The physical uplink signal information may be sounding reference signal (Sounding Reference Signal, SRS) information or the like, and the physical uplink data channel information may be physical uplink shared channel (Physical Uplink Shared Channel, PUSCH) information, physical uplink control channel (Physical Uplink Control Channel, PUCCH) information, or the like.

It should be noted that in this embodiment of this application, both the first cell and the second cell are cells in which the network device establishes a connection, uplink frequencies configured for the first cell and the second cell are the same, and downlink frequencies configured for the first cell and the second cell are different. The first cell and the second cell may share an uplink spectrum of the first cell. In addition, both an uplink frequency and a downlink frequency of the first cell may be low frequencies, an uplink frequency of the second cell is a low frequency, and a downlink frequency of the second cell is a high frequency. For example, the first cell is an LTE (FDD) cell, the uplink frequency is 1.8 GHz, and the downlink frequency is 1.9 GHz. The second cell is an NR cell, the uplink frequency is 1.8 GHz, and the downlink frequency is 3.5 GHz.

Optionally, a coverage area of the first cell may be the same as or different from a coverage area of the second cell. This is not limited in this embodiment of this application.

The following specifically describes how the terminal determines the uplink transmit power for sending the uplink signal such as the sounding reference signal information, the physical uplink data channel information, and/or the physical uplink control channel information.

In a first possible scenario, in an $i^{th}$ transmission time unit, when the terminal transmits physical uplink data channel information in the second cell, uplink transmit power of the physical uplink data channel information may meet the following formula:

$$P_{PUSCH,c_2}(i) = \min\left\{\begin{array}{l}P_{CMAX,c_2}(i),\\ 10\log_{10}(M_{PUSCH,c_2}(i)) + P_{O\_PUSCH,c_2}(j) + \alpha_{c_2}(j) \cdot PL_{c_1} + \Delta_{TF,c_2}(i) + f_{c_2}(i)\end{array}\right\}[dBM]$$

$P_{CMAX,c_2}(i)$ is maximum transmit power configured on a network side for the terminal in the second cell, $M_{PUSCH,c_2}(i)$ is a quantity of resource blocks corresponding to a physical uplink data channel of the second cell in frequency domain, $P_{O\_PUSCH,c_2}(j)$ and $\alpha_{c_2}(j)$ are parameters configured by the network device by using higher layer signaling, $PL_{c_1}$ is the downlink path loss estimate, $\Delta_{TF,c_2}(i)$ is a power offset based on a modulation and coding scheme, and $f_{c_2}(i)$ is a closed-loop power control parameter that is of the second cell and that is configured by using downlink control information.

In a second possible scenario, in an $i^{th}$ transmission time unit, when the terminal simultaneously transmits physical uplink data channel information and physical uplink control channel information in the second cell, uplink transmit power of the physical uplink data channel information may meet the following formula:

$$P_{PUSCH,c_2}(i) = \left\{\begin{array}{l}10\log_{10}(\hat{P}_{CMAX,c_2}(i) - \hat{P}_{PUCCH}(i)),\\ 10\log_{10}(M_{PUSCH,c_2}(i)) + P_{O\_PUSCH,c_2}(j) + \alpha_{c_2}(j) \cdot PL_{c_1} + \Delta_{TF,c_2}(i) + f_{c_2}(i)\end{array}\right\}[dBM]$$

$\hat{P}_{CMAX,c_2}(i)$ is a linear value of $P_{CMAX,c_2}(i)$, $P_{CMAX,c_2}(i)$ is maximum transmit power configured on a network side for the terminal in the second cell, $M_{PUSCH,c_2}(i)$ is a quantity of resource blocks corresponding to a physical uplink data channel of the second cell in frequency domain, $P_{O\_PUSCH,c_2}(I)$ and $\alpha_{c_2}(j)$ are parameters configured by using higher layer signaling, $PL_{c_1}$ is the downlink path loss estimate of the first cell, $\Delta_{TF,c_2}(i)$ is a power offset based on a modulation and coding scheme of the second cell, $f_{c_2}(i)$ is a closed-loop power control parameter that is of the second cell and that is configured by using downlink control information, $\hat{P}_{PUCCH}(i)$ is a linear value of $P_{PUCCH}(i)$, $P_{PUCCH}(i)$ is transmit power of the physical uplink control channel information, and $P_{PUCCH}(i)$ may meet the following formula:

$$P_{PUCCH}(i) = \min\begin{Bmatrix} P_{CMAX,c_2}(i), \\ P_{0\_PUCCH} + PL_{c_1} + h(n_{CQI}, n_{HARQ}, n_{SR}) + \Delta_{F\_PUCCH}(F) + \Delta_{TxD}(F') + g(i) \end{Bmatrix}[dBM]$$

$P_{0\_PUCCH}$ is a power reference value configured by using the higher layer signaling, $h(n_{CQI}, n_{HARQ}, n_{SR})$ is a power offset set based on carried channel quality information and a quantity of response bits, $\Delta_{F\_PUCCH}(F)$ is a parameter that is related to a physical uplink control channel format and configured by using the higher layer signaling, $\Delta_{TxD}(F')$ is a power offset determined based on an modulation and coding scheme and a data type, and $g(i)$ is an adjustment value of closed-loop power control of the terminal.

In a third possible scenario, in an $i^{th}$ transmission time unit, when the terminal sends sounding reference signal information in the second cell, uplink transmit power of the sounding reference signal information may meet the following formula:

$$P_{SRS,c_2}(i) = \min\begin{Bmatrix} P_{CMAX,c_2}(i), \\ P_{SRS\_OFFSET,c_2} + 10\log_{10}(M_{SRS,c_2}(i)) + P_{O\_PUSCH,c_2}(j) + \alpha_{c_2}(j) \cdot PL_{c_1} + f_{c_2}(i) \end{Bmatrix}[dBM]$$

$P_{CMAX,c_2}(i)$ is maximum transmit power configured on a network side for the terminal in the second cell, $P_{SRS\_OFFSET,c_2}$ is a power offset of the second cell configured by using higher layer signaling, $M_{SRS,c_2}(i)$ is a quantity of resource blocks corresponding to an SRS of the second cell in frequency domain, $P_{O\_PUSCH,c_2}(j)$ and $\alpha_{c_2}(j)$ are parameters configured by using the higher layer signaling, $PL_{c_1}$ is the downlink path loss estimate of the first cell, and $f_{c_2}(i)$ is a closed-loop power control parameter that is of the second cell and that is configured by using downlink control information.

It should be noted that in this embodiment of this application, the transmission time unit may be a time length specified in a protocol, for example, may be a time length of a timeslot, or may be a time length of a subframe. This is not limited in this embodiment of this application.

According to the foregoing method, the terminal determines the downlink path loss estimate between the terminal and the first cell based on the receive power for receiving the downlink reference signal of the first cell, and determines the uplink transmit power of the terminal in the second cell based on the downlink path loss estimate, so that when there is no reciprocity between an uplink channel and a downlink channel of the second cell, the terminal determines the uplink transmit power of the terminal in the second cell by using the first cell. When the uplink frequencies configured for the first cell and the second cell are the same, and there is reciprocity between an uplink channel and a downlink channel of the first cell (for example, the uplink frequency and the downlink frequency are close), the uplink transmit power of the terminal in the second cell may be accurately determined, thereby resolving an inaccuracy problem of estimating a low-frequency uplink path loss by using a high-frequency downlink reference signal due to non-reciprocity between a high-frequency channel and a low-frequency channel.

Each cell has a cell identifier used to identify the cell. An LTE system is used as an example. A total of 504 different physical cell identifiers (Physical Cell Identity, PCI) are defined in the LTE system. A terminal determines a cell PCI through detection of a cell synchronization signal, where the cell synchronization signal includes a primary synchronization signal (Primary Synchronization Signal, PSS) and a secondary synchronization signal (Secondary Synchronization Signal, SSS). A set of all PCIs is divided into 168 groups, and each group includes three cell IDs, that is, $$N_{ID}^{cell} = 3N_{ID}^{(1)} + N_{ID}^{(2)}.$$

There are three values of a root index (Root index) u for generating a primary synchronization signal, so that three different Zadoff-Chu (ZC) sequences are determined, and each ZC sequence corresponds to one $N_{ID}^{(2)}$. To receive a PSS, the terminal attempts to decode the PSS by using the root index u, until the PSS is successfully decoded by using one value of one root index u. In this way, the terminal learns $N_{ID}^{(2)}$ of the cell.

Values m_0 and m_1 for generating a secondary synchronization signal are derived from a set of 168 optional values, corresponding to 168 different $N_{ID}^{(1)}$s. After successfully decoding the PSS, the terminal performs blind detection on an SSS. If the SSS is successfully decoded, one of the 168 values is determined, and $N_{ID}^{(1)}$ is also determined. A PCI of the cell is obtained based on $N_{ID}^{(1)}$ and $N_{ID}^{(2)}$ that is obtained during PSS detection.

Certainly, the foregoing merely uses the LTE system as an example to describe how the terminal determines a PCI of a cell, and how the terminal determines a PCI of a cell in an NR system is not limited in this embodiment of this application, and may be the same as or different from the foregoing method.

In the LTE system, during uplink sending, the terminal usually needs to use a cell PCI to generate an uplink reference signal cyclic shift and an uplink data scrambling sequence. Inter-cell interference randomization can be implemented by using the cell PCI to generate the uplink reference signal cyclic shift and the uplink data scrambling sequence, thereby improving transmission robustness.

It is assumed that a network device simultaneously establishes connections of two cells: a first cell and a second cell, uplink frequencies of the two cells are the same, and downlink frequencies of the two cells are different. For example, the first cell is an LTE cell, an uplink frequency is 1.8 GHz, and a downlink frequency is 1.9 GHz. The second cell is an NR cell, an uplink frequency is 1.8 GHz, and a downlink frequency is 3.5 GHz. After the terminal simultaneously accesses the first cell and the second cell, when the terminal performs uplink transmission by using a cell PCI corresponding to each cell, although inter-terminal interference is randomized by using different cell PCIs, because these terminals belong to a same cell, the inter-terminal interference is still great.

Figure 5:
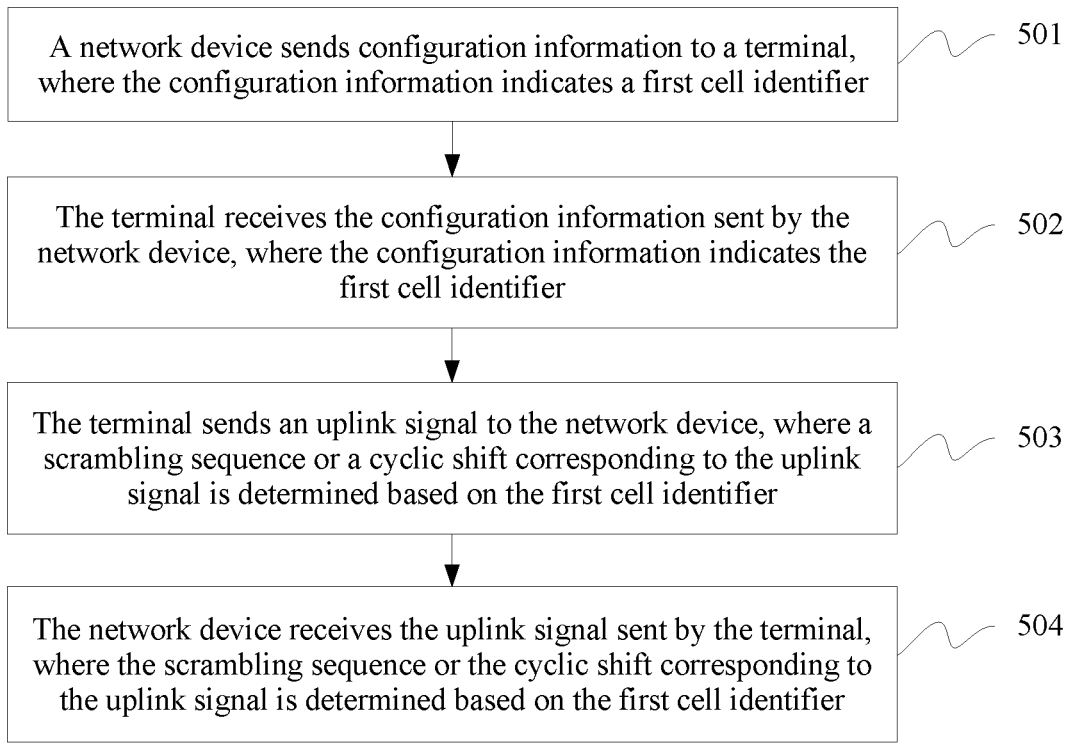
FIG. 5 is a schematic flowchart of a communication method according to an embodiment of this application.

Based on the foregoing description, FIG. 5 is a schematic flowchart of a communication method according to an embodiment of this application.

Referring to FIG. 5, the method includes the following steps:

Step 501: A network device sends configuration information to a terminal, where the configuration information indicates a first cell identifier.

Step 502: The terminal receives the configuration information sent by the network device, where the configuration information indicates the first cell identifier.

Step 503: The terminal sends an uplink signal to the network device, where a scrambling sequence or a cyclic shift corresponding to the uplink signal is determined based on the first cell identifier.

Step 504: The network device receives the uplink signal sent by the terminal, where the scrambling sequence or the cyclic shift corresponding to the uplink signal is determined based on the first cell identifier.

In step 501, the network device may send the configuration information to the terminal by using higher layer signaling. The higher layer signaling may be any one of the following:

System information (System Information, SI): The system information may be used to indicate a parameter configuration status of a cell, such as common radio resource configuration information of the cell and extended access barring (Extended Access Barring, EAB) information of the cell.

Random access response (Random Access Response, RAR): The response is a response message returned by the network device to the terminal after the terminal sends a preamble to the network device, when the terminal accesses the network device in a random access manner.

Message 3 in a random access procedure: The message is a message sent to the network device after the terminal receives the RAR message returned by the network device, when the terminal accesses the network device in a contention-based random access manner.

Radio resource control (Radio Resource Control, RRC) signaling: is used to control and manage a radio resource.

It should be noted that in this embodiment of this application, the network device establishes a connection of a first cell and a connection of a second cell, uplink frequencies configured for the first cell and the second cell are the same, and downlink frequencies configured for the first cell and the second cell are different. The first cell may be a master cell, and the second cell may be a secondary cell. The network device sends higher layer signaling and a broadcast message to the terminal only by using the master cell. Certainly, the second cell may alternatively be a master cell, and the first cell may alternatively be a secondary cell.

Optionally, the first cell is an LTE cell, and the second cell is an NR cell.

In this embodiment of this application, the first cell identifier may be a cell identifier of the first cell of the network device. Alternatively, the first cell identifier may be a cell identifier of the second cell of the network device. Alternatively, the first cell identifier may be any cell identifier configured by the network device, other than a cell identifier of the first cell and a cell identifier of the second cell.

When the first cell identifier is the cell identifier of the first cell of the network device, the network device may send the configuration information to the terminal in the second cell. Correspondingly, when the first cell identifier is the cell identifier of the second cell of the network device, the network device may send the configuration information to the terminal in the first cell.

When the first cell identifier is any cell identifier configured by the network device, other than the cell identifier of the first cell and the cell identifier of the second cell, the network device may separately send the configuration information to the terminal in the first cell and the second cell.

With reference to the foregoing description, in step 502, the terminal may receive the configuration information by using higher layer signaling sent by the network device.

In addition, when the first cell identifier indicated by the configuration information is the cell identifier of the first cell of the network device, the terminal may receive, in the second cell of the network device, the configuration information sent by the network device. Correspondingly, when the first cell identifier indicated by the configuration information is the cell identifier of the second cell of the network device, the terminal may receive, in the first cell of the network device, the configuration information sent by the network device.

When the first cell identifier indicated by the configuration information is any cell identifier configured by the network device, other than the cell identifier of the first cell and the cell identifier of the second cell, the terminal may separately receive the configuration information in the first cell and the second cell of the network device.

It should be noted that in this embodiment of this application, the terminal may further determine the cell identifier of the first cell based on a received synchronization signal of the first cell, and determine the cell identifier of the second cell based on a received synchronization signal of the second cell. For a specific determining method, refer to the foregoing description, and details are not described herein again.

In step 503, after obtaining the first cell identifier, the terminal may determine, based on the first cell identifier, the scrambling sequence or the cyclic shift of the uplink signal sent to the first cell or the second cell of the network device.

In this embodiment of this application, the uplink signal may be physical uplink channel information or physical uplink signal information. A physical uplink channel may be a channel such as a PUCCH or a PUSCH, and a physical uplink signal may be a signal such as an SRS.

It should be noted that how to specifically determine the scrambling sequence or the cyclic shift of the uplink signal based on the first cell identifier is not limited in this embodiment of this application.

According to the foregoing method, the network device indicates, to the terminal, the first cell identifier used for sending the uplink signal, so that when sending the uplink signal to the first cell and the second cell, the terminal in both the first cell and the second cell of the network device determines the scrambling sequence or the cyclic shift of the uplink signal by using the same first cell identifier, thereby reducing inter-terminal interference.

Based on a same technical conception, an embodiment of this application further provides a terminal.

Figure 6:
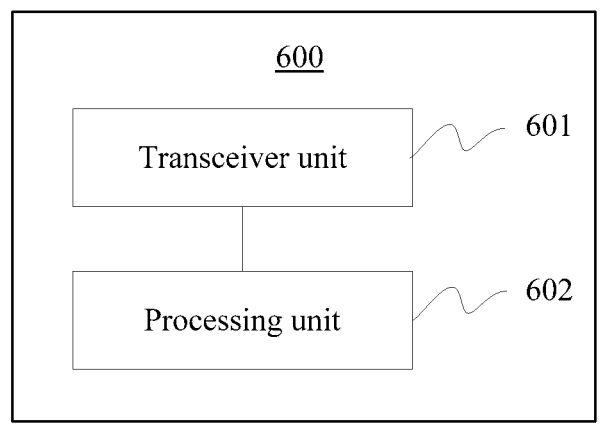
FIG. 6 is a schematic structural diagram of a terminal according to an embodiment of this application.

FIG. 6 is a schematic structural diagram of a terminal according to an embodiment of this application. The terminal may perform step 402 and step 403 in the process shown in FIG. 4, and content related to step 402 and step 403.

Referring to FIG. 6, the terminal 600 includes:
a transceiver unit 601, configured to receive a downlink reference signal sent by a network device in a first cell; and
a processing unit 602, configured to determine a downlink path loss estimate between the terminal and the first cell based on the downlink reference signal.

The transceiver unit 601 is configured to send an uplink signal in a second cell, where uplink transmit power used by the terminal to send the uplink signal is determined based on the downlink path loss estimate.

For other content in the steps performed by the transceiver unit 601 and the processing unit 602, refer to the foregoing description. Details are not described herein again.

It should be understood that division of the foregoing units is merely logical function division. In actual implementation, all or some of the units may be integrated into one physical entity, or may be physically separate.

Figure 7:
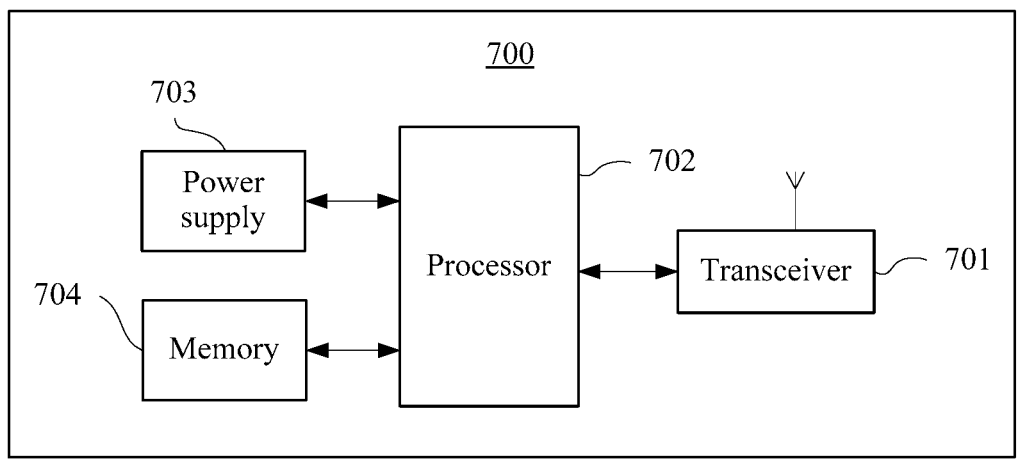
FIG. 7 is a schematic structural diagram of a terminal according to an embodiment of this application.

FIG. 7 is a schematic structural diagram of a terminal according to an embodiment of this application. The terminal may perform step 402 and step 403 in the process shown in FIG. 4, and content related to step 402 and step 403.

Referring to FIG. 7, the terminal 700 includes:
a transceiver 701, configured to receive a downlink reference signal sent by a network device in a first cell; and
a processor 702, configured to determine a downlink path loss estimate between the terminal and the first cell based on the downlink reference signal.

The transceiver 701 is configured to send an uplink signal in a second cell, where uplink transmit power used by the terminal to send the uplink signal is determined based on the downlink path loss estimate.

The terminal 700 may further include a power supply 703 (such as a battery) that supplies power to each component. Optionally, the power supply 703 may be logically connected to the processor 702 by using a power management system, so as to implement functions such as charging management, discharging management, and power consumption management by using the power management system.

The terminal 700 may further include a memory 704, and the memory 704 may be configured to store a software program and a module. The processor 702 runs the software program and the module that are stored in the memory 704, so as to perform various functional applications of the apparatus and data processing.

Optionally, the processor 702 is specifically configured to:
determine the downlink path loss estimate based on receive power for receiving the downlink reference signal and transmit power for sending the downlink reference signal.

Optionally, uplink frequencies configured for the first cell and the second cell are the same, and downlink frequencies configured for the first cell and the second cell are different.

Optionally, the uplink signal is physical uplink channel information or physical uplink signal information.

Figure 8:
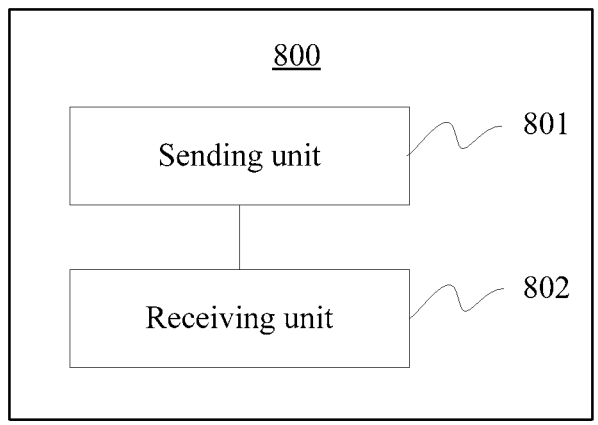
FIG. 8 is a schematic structural diagram of a network device according to an embodiment of this application.

FIG. 8 is a schematic structural diagram of a network device according to an embodiment of this application. The network device may perform step 401 and step 404 in the process shown in FIG. 4, and content related to step 401 and step 404.

Referring to FIG. 8, the network device 800 includes:
a sending unit 801, configured to send a downlink reference signal to a terminal in a first cell; and
a receiving unit 802, configured to receive an uplink signal sent by the terminal in a second cell, where uplink transmit power of the uplink signal is determined by the terminal based on a downlink path loss estimate of the terminal in the first cell, and the downlink path loss estimate is determined by the terminal based on the downlink reference signal.

Figure 9:
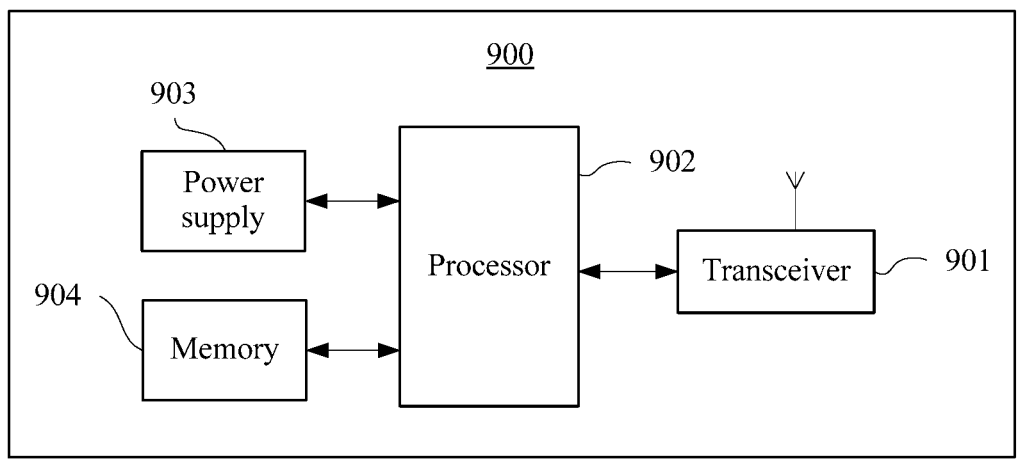
FIG. 9 is a schematic structural diagram of a network device according to an embodiment of this application.

FIG. 9 is a schematic structural diagram of a network device according to an embodiment of this application. The network device may perform step 401 and step 404 in the process shown in FIG. 4, and content related to step 401 and step 404.

Referring to FIG. 9, the network device 900 includes:
a processor 902, configured to send a downlink reference signal to a terminal in a first cell by using a transceiver 901.

The processor 902 is configured to receive, by using the transceiver 901, an uplink signal sent by the terminal in a second cell, where uplink transmit power of the uplink signal is determined by the terminal based on a downlink path loss estimate of the terminal in the first cell, and the downlink path loss estimate is determined by the terminal based on the downlink reference signal.

The network device 900 may further include a power supply 903 (such as a battery) that supplies power to each component. Optionally, the power supply 903 may be logically connected to the processor 902 by using a power management system, so as to implement functions such as charging management, discharging management, and power consumption management by using the power management system.

The network device 900 may further include a memory 904, and the memory 904 may be configured to store a software program and a module. The processor 902 runs the software program and the module that are stored in the memory 904, so as to perform various functional applications of the apparatus and data processing.

Figure 10:
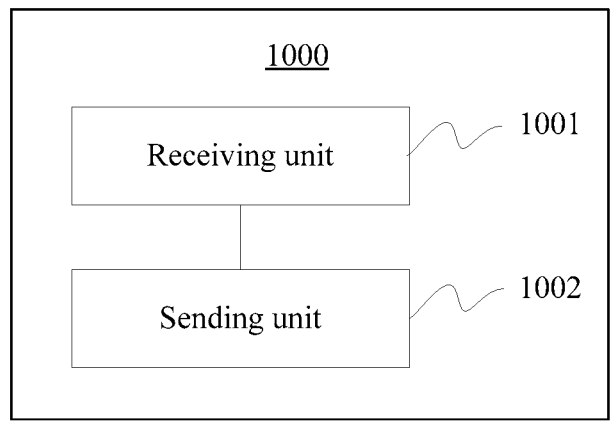
FIG. 10 is a schematic structural diagram of a terminal according to an embodiment of this application.

FIG. 10 is a schematic structural diagram of a terminal according to an embodiment of this application. The terminal may perform step 502 and step 503 in the process shown in FIG. 5, and content related to step 502 and step 503.

Referring to FIG. 10, the terminal 1000 includes:
a receiving unit 1001, configured to receive configuration information sent by a network device, where the configuration information indicates a first cell identifier; and
a sending unit 1002, configured to send an uplink signal to the network device, where a scrambling sequence or a cyclic shift corresponding to the uplink signal is determined based on the first cell identifier.

For other content in the steps performed by the receiving unit 1001 and the sending unit 1002, refer to the foregoing description. Details are not described herein again.

It should be understood that division of the foregoing units is merely logical function division. In actual implementation, all or some of the units may be integrated into one physical entity, or may be physically separate.

Figure 11:
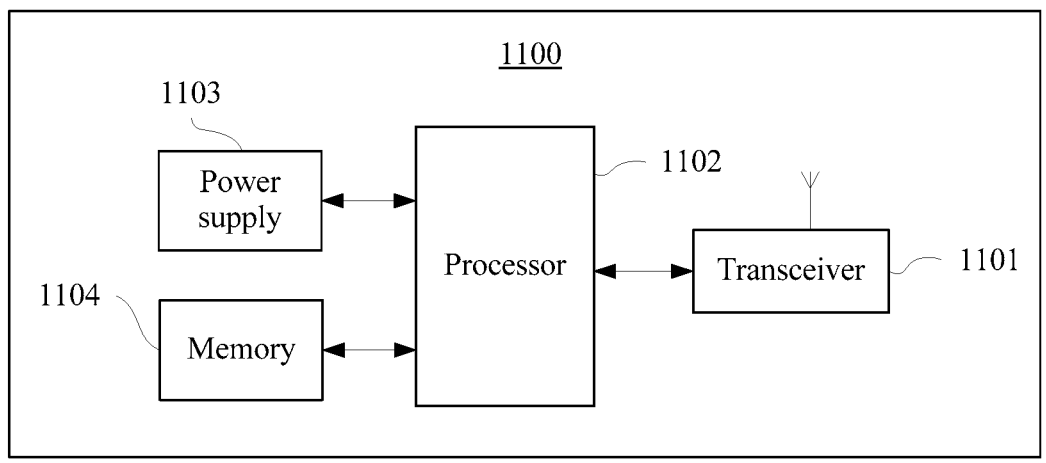
FIG. 11 is a schematic structural diagram of a terminal according to an embodiment of this application.

FIG. 11 is a schematic structural diagram of a terminal according to an embodiment of this application. The terminal may perform step 502 and step 503 in the process shown in FIG. 5, and content related to step 502 and step 503.

Referring to FIG. 11, the terminal 1100 includes:
a processor 1102, configured to receive, by using a transceiver 1101, configuration information sent by a network device, where the configuration information indicates a first cell identifier.

The processor 1102 is configured to send an uplink signal to the network device by using the transceiver 1101, where a scrambling sequence or a cyclic shift corresponding to the uplink signal is determined based on the first cell identifier.

The terminal 1100 may further include a power supply 1103 (such as a battery) that supplies power to each component. Optionally, the power supply 1103 may be logically connected to the processor 1102 by using a power management system, so as to implement functions such as charging management, discharging management, and power consumption management by using the power management system.

The terminal 1100 may further include a memory 1104, and the memory 1104 may be configured to store a software program and a module. The processor 1102 runs the software program and the module that are stored in the memory 1104, so as to perform various functional applications of the apparatus and data processing.

Optionally, the transceiver 1101 is specifically configured to:
send the uplink signal to a first cell or a second cell of the network device, where uplink frequencies configured for the first cell and the second cell are the same, and downlink frequencies configured for the first cell and the second cell are different.

Optionally, the transceiver 1101 is specifically configured to:
receive, in the first cell of the network device, the configuration information sent by the network device, where the first cell identifier indicated by the configuration information is a cell identifier of the second cell of the network device.

Optionally, the transceiver 1101 is specifically configured to:
receive, in the second cell of the network device, the configuration information sent by the network device, where the first cell identifier indicated by the configuration information is a cell identifier of the first cell of the network device.

Optionally, the transceiver 1101 is specifically configured to:
receive the configuration information by using higher layer signaling sent by the network device, where the higher layer signaling is any one of the following:
system information;
a random access response;
a message 3 in a random access procedure; and
radio resource control signaling.

Optionally, the uplink signal is physical uplink channel information or physical uplink signal information.

Figure 12:
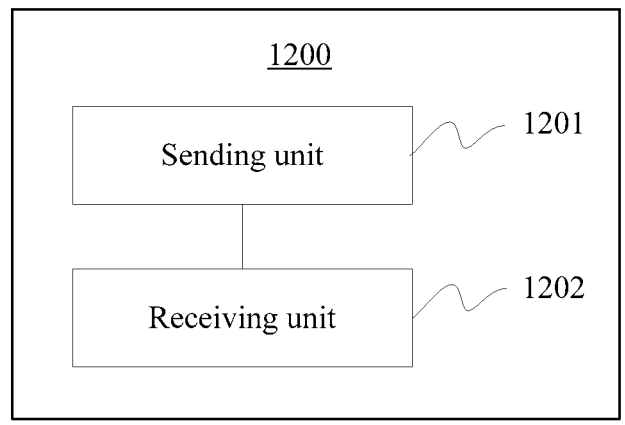
FIG. 12 is a schematic structural diagram of a network device according to an embodiment of this application.

FIG. 12 is a schematic structural diagram of a network device according to an embodiment of this application. The network device may perform step 501 and step 504 in the process shown in FIG. 5, and content related to step 501 and step 504.

Referring to FIG. 12, the network device 1200 includes:
a sending unit 1201, configured to send configuration information to a terminal, where the configuration information indicates a first cell identifier; and
a receiving unit 1202, configured to receive an uplink signal sent by the terminal, where a scrambling sequence or a cyclic shift corresponding to the uplink signal is determined based on the first cell identifier.

For other content in the steps performed by the receiving unit 1202 and the sending unit 1201, refer to the foregoing description. Details are not described herein again.

Figure 13:
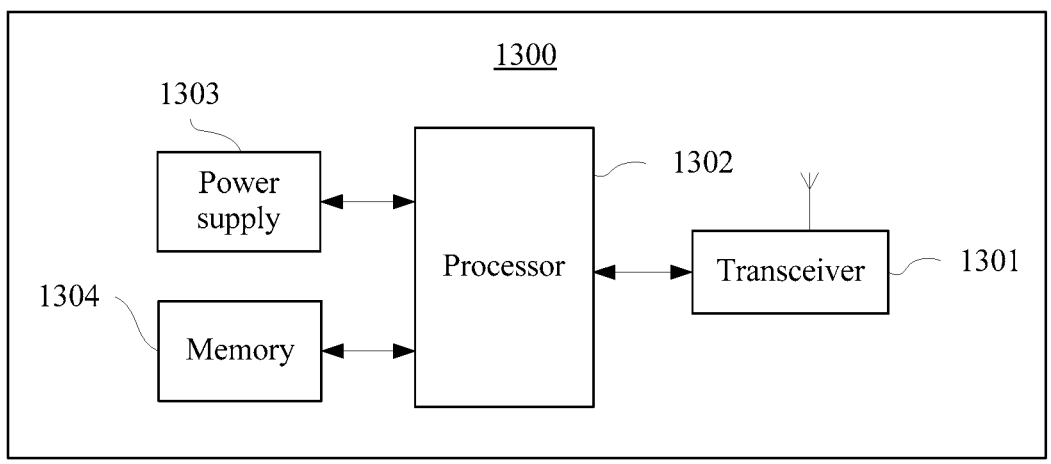
FIG. 13 is a schematic structural diagram of a network device according to an embodiment of this application.

FIG. 13 is a schematic structural diagram of a network device according to an embodiment of this application. The network device may perform step 501 and step 504 in the process shown in FIG. 5, and content related to step 501 and step 504.

Referring to FIG. 13, the network device 1300 includes:
a processor 1302, configured to send configuration information to a terminal by using a transceiver 1301, where the configuration information indicates a first cell identifier.

The processor 1302 is configured to receive, by using the transceiver 1301, an uplink signal sent by the terminal, where a scrambling sequence or a cyclic shift corresponding to the uplink signal is determined based on the first cell identifier.

The network device 1300 may further include a power supply 1303 (such as a battery) that supplies power to each component. Optionally, the power supply 1303 may be logically connected to the processor 1302 by using a power management system, so as to implement functions such as charging management, discharging management, and power consumption management by using the power management system.

The network device 1300 may further include a memory 1304, and the memory 1304 may be configured to store a software program and a module. The processor 1302 runs the software program and the module that are stored in the memory 1304, so as to perform various functional applications of the apparatus and data processing.

Optionally, the transceiver 1301 is specifically configured to:
send the configuration information to the terminal by using higher layer signaling, where
the higher layer signaling is any one of the following:
system information;
a random access response;
a message 3 in a random access procedure; and
radio resource control signaling.

An embodiment of this application further provides a computer readable storage medium, configured to store a computer software instruction that needs to be executed by the foregoing processor. The computer software instruction includes a program that needs to be executed by the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, wherein the method comprises:
    receiving, by a terminal, a downlink reference signal sent by a network device in a first cell on a first downlink frequency;
    determining, by the terminal, a downlink path loss estimate between the terminal and the first cell based on the downlink reference signal received on the first downlink frequency;
    determining, by the terminal, uplink transmit power for a second cell having a second downlink frequency based on a value of $\alpha_{c_2} \cdot PL_{c_1}$ where $c_1$ represents the first cell having the first downlink frequency, $c_2$ represents the second cell having the second downlink frequency, the first downlink frequency is different than the second downlink frequency, $\alpha_{c_2}$ represents a network configured parameter for the second cell, and $PL_{c_1}$ represents the downlink path loss estimate determined based on the downlink reference signal received on the first downlink frequency, wherein uplink frequencies configured for the first cell and the second cell are the same; and
    sending, by the terminal, an uplink signal in the second cell using the determined uplink transmit power.

2. The method according to claim 1, wherein the determining, by the terminal, a downlink path loss estimate between the terminal and the first cell based on the downlink reference signal comprises:
    determining, by the terminal, the downlink path loss estimate based on receive power for receiving the downlink reference signal and transmit power for sending the downlink reference signal.

3. The method according to claim 2, wherein the downlink path loss estimate is a difference between the receive power for receiving the downlink reference signal and the transmit power for sending the downlink reference signal.

4. The method according to claim 1, wherein the uplink signal is physical uplink channel information or physical uplink signal information.

5. The method according to claim 1, wherein the first cell is a primary cell, and the second cell is a secondary cell.

6. The method according to claim 1, wherein the first cell is a long term evolution (LTE) cell, and the second cell is a new radio (NR) cell.

7. A terminal, comprising a transceiver and a processor, wherein
    the transceiver is configured to receive a downlink reference signal sent by a network device in a first cell on a first downlink frequency;
    the processor is configured to:
        determine a downlink path loss estimate between the terminal and the first cell based on the downlink reference signal received on the first downlink frequency; and
        determine uplink transmit power for a second cell having a second downlink frequency based on a value of $\alpha_{c_2} \cdot PL_{c_1}$ where $c_1$ represents the first cell having the first downlink frequency, $c_2$ represents the second cell having the second downlink frequency, the first downlink frequency is different than the second downlink frequency, $\alpha_{c_2}$ represents a network configured parameter for the second cell, and $PL_{c_1}$ represents the downlink path loss estimate determined based on the downlink reference signal received on the first downlink frequency, wherein uplink frequencies configured for the first cell and the second cell are the same; and
    the transceiver is further configured to send an uplink signal in the second cell using the determined uplink transmit power.

8. The terminal according to claim 7, wherein the processor is configured to:
    determine the downlink path loss estimate based on receive power for receiving the downlink reference signal and transmit power for sending the downlink reference signal.

9. The terminal according to claim 8, wherein the downlink path loss estimate is a difference between the receive power for receiving the downlink reference signal and the transmit power for sending the downlink reference signal.

10. The terminal according to claim 7, wherein the uplink signal is physical uplink channel information or physical uplink signal information.

11. The terminal according to claim 7, wherein the first cell is a primary cell, and the second cell is a secondary cell.

12. A non-transitory machine-readable medium having stored thereon, a computer program comprising instructions, the instructions being executable by a computer for causing a terminal to perform the following:
   receiving a downlink reference signal sent by a network device in a first cell on a first downlink frequency;
   determining a downlink path loss estimate between the terminal and the first cell based on the downlink reference signal received on the first downlink frequency;
   determining uplink transmit power for a second cell having a second downlink frequency based on a value of $\alpha_{c_2} \cdot PL_{c_1}$, where $c_1$ represents the first cell having the first downlink frequency, $c_2$ represents the second cell having the second downlink frequency, the first downlink frequency is different than the second downlink frequency, $\alpha_{c_2}$ represents a network configured parameter for the second cell, and $PL_{c_1}$ represents the downlink path loss estimate determined based on the downlink reference signal received on the first downlink frequency, wherein uplink frequencies configured for the first cell and the second cell are the same; and
   sending an uplink signal in the second cell using the determined uplink transmit power.

13. The medium according to claim 12, wherein the determining a downlink path loss estimate between the terminal and the first cell based on the downlink reference signal comprises:
   determining the downlink path loss estimate based on receive power for receiving the downlink reference signal and transmit power for sending the downlink reference signal.

14. The medium according to claim 13, wherein the downlink path loss estimate is a difference between the receive power for receiving the downlink reference signal and the transmit power for sending the downlink reference signal.

15. The medium according to claim 12, wherein the uplink signal is physical uplink channel information or physical uplink signal information.

16. The medium according to claim 12, wherein the first cell is a primary cell, and the second cell is a secondary cell.

* * * * *